(12) United States Patent
Katsoulakos et al.

(10) Patent No.: US 11,599,853 B2
(45) Date of Patent: Mar. 7, 2023

(54) COOPERATIVE STOCK OPTIMIZATION FOR INTEGRATIVE SUPPLY CHAIN MANAGEMENT

(71) Applicant: Inlecom Systems Limited, London (GB)

(72) Inventors: Panayotis Katsoulakos, W Sussex (GB); Nikolaos Tsampieris, Rafina (GR); Zisis Palaskas, Athens (GR); Yash Chadha, London (GB)

(73) Assignee: INLECOM SYSTEMS LIMITED, London (GB)

( * ) Notice: Subject to any disclaimer, the term of this patent is extended or adjusted under 35 U.S.C. 154(b) by 74 days.

(21) Appl. No.: 16/285,515

(22) Filed: Feb. 26, 2019

(65) Prior Publication Data

US 2020/0272989 A1    Aug. 27, 2020

(51) Int. Cl.
*G06Q 10/0875* (2023.01)
*G06F 16/29* (2019.01)
(Continued)

(52) U.S. Cl.
CPC ......... *G06Q 10/0875* (2013.01); *G06F 16/29* (2019.01); *G06Q 10/06312* (2013.01); *G06Q 10/0835* (2013.01)

(58) Field of Classification Search
CPC ........ G06F 16/29; G06F 16/40; G06F 16/487; G06F 16/587; G06F 16/687;
(Continued)

(56) References Cited

U.S. PATENT DOCUMENTS

2005/0065828 A1\* 3/2005 Kroswek ................ G06Q 10/08
705/22
2006/0195563 A1\* 8/2006 Chapin ............... H04L 67/1095
709/224

(Continued)

OTHER PUBLICATIONS

Anonymous, Client-Server Model—Wikipedia, the free encyclopedia, Jan. 24, 2013.

*Primary Examiner* — Peter Ludwig
*Assistant Examiner* — Avia Salman
(74) *Attorney, Agent, or Firm* — CRGO Global; Steven M. Greenberg

(57) ABSTRACT

In a stock rebalancing method, separate inventory holding clients are registered, each as individual publishers of inventory level data, and further, separate transporter clients also are registered each as individual publishers of transport capacity. Then, an indication is received from one of the inventory holding clients, of an overstock condition of a specified item. Contemporaneously, an indication is received from another of the inventory holding clients of an understock condition of the specified item. In response, one of the transporter clients is identified as indicating excess capacity sufficient to bear transport of the specified item in a quantity indicated by the understock condition, the clients are messaged indicating the conditions, and the identified transport client is directed to transport the specified item in the indicated quantity from the one of the inventory clients indicating the overstock condition to the one of the inventory holding clients indicating an understock condition.

15 Claims, 2 Drawing Sheets

(51) Int. Cl.
*G06Q 10/0631* (2023.01)
*G06Q 10/0835* (2023.01)

(58) Field of Classification Search
CPC .............. G06F 16/787; G06F 16/909; G06F 2221/2113; G06Q 10/06312; G06Q 10/0835; G06Q 10/0875; G06Q 10/087; G06Q 20/203; G06Q 10/08; G06Q 10/06; G06Q 30/0205; H04L 5/0069; H04N 2201/3253
See application file for complete search history.

(56) References Cited

U.S. PATENT DOCUMENTS

| | | | | |
|---|---|---|---|---|
| 2008/0314981 | A1* | 12/2008 | Eisenson | G06Q 10/0875 |
| | | | | 705/28 |
| 2017/0132668 | A1* | 5/2017 | Myers | G06Q 30/0277 |
| 2018/0342007 | A1* | 11/2018 | Brannigan | G06Q 30/0643 |

* cited by examiner

COOPERATIVE STOCK OPTIMIZATION FOR INTEGRATIVE SUPPLY CHAIN MANAGEMENT

BACKGROUND OF THE INVENTION

Field of the Invention

The present invention relates to the field of stock level management and more particularly to stock level management within the supply chain.

Description of the Related Art

A supply chain is a network between a company and its suppliers to produce and distribute a specific product, and the supply chain represents the steps it takes to get the product or service to the customer. Supply chain management is a crucial process because an optimized supply chain results in lower costs and a faster production cycle. Business logistics management refers to the production and distribution process within the company, while supply chain management includes suppliers, manufacturers, logistics and transportation companies and retailers that distribute the product to the end customer. Supply chains include every business that comes in contact with a particular product, including companies that assemble and deliver parts to the manufacturer.

Because the traditional supply chain involves many different actors utilizing many different disparate information systems, information sharing amongst the different actors can be challenging. Transparency into the state of affairs of a given transaction depends largely upon the willingness and diligence of each actor in the supply chain of the transaction to provide accurate and timely information to one another. In a single transaction, so much seems not so daunting, but in a supply chain ecosystem of hundreds if not thousands of transactions are ongoing at any given time and much of the resources available within the ecosystem—particularly in respect to transportation and logistics—remain dependent upon the state of multiple different transactions.

A supply chain information sharing system aims to provide some transparency into the state of affairs of different transactions in a corresponding supply chain. As part of the transparency, the supply chain information system ingests data from different actors in the supply chain, processes the ingested data in order to produce a result reflective of a state of the supply chain, and exposes the produced result to one or more of the actors. In a supply chain spanning a single jurisdiction amongst only a handful of actors, so much is not of tremendous consequence, but in a supply chain that spans different jurisdictional boundaries and involves many different actors with different policies regarding the privacy of data, maintaining both transparency of transactions in the supply chain while not running afoul of the data privacy policies of both the private actors in the supply chain and the public governmental interests in which the actors reside can be challenging.

BRIEF SUMMARY OF THE INVENTION

Embodiments of the present invention address deficiencies of the art in respect to inventory management in a supply chain and provide a novel and non-obvious method, system and computer program product for cooperative stock optimization for integrative supply chain management. In an embodiment of the invention, separate inventory holding clients are registered, each as individual publishers of inventory level data to a stock rebalancer, and further, separate transporter clients also are registered each as individual publishers of transport capacity to the stock rebalancer. Then, an indication is received from one of the inventory holding clients, of an overstock condition of a specified item. Contemporaneously, an indication is received, from another of the inventory holding clients, of an understock condition of the specified item. In response to the receipt of the indications of both the overstock and under stock conditions for the specified item, one of the transporter clients is identified as indicating excess capacity sufficient to bear transport of the specified item in a quantity indicated by the understock condition. As such, the clients are messaged with a message that indicates the overstock, understock and excess capacity conditions. Consequently, the identified one of the transport clients is directed to transport the specified item in the indicated quantity from the one of the inventory clients indicating the overstock condition to the one of the inventory holding clients indicating an understock condition.

In one aspect of the embodiment, a table of override rules is loaded and the rules evaluated in respect to data characterizing at least one of the clients and at least one of the overstock, understock and excess capacity conditions. As a result, the directing of the identified one of the transport clients to transport the specified item may be overridden responsive to the evaluation. In another aspect of the embodiment, multiple ones of the transporter clients indicating excess capacity sufficient to bear transport of the specified item in a quantity indicated by the understock condition are identified, and only one of the identified transporter clients is then selected based upon an assigned priority value. Alternatively, multiple ones of the transporter clients indicating excess capacity sufficient to bear transport of the specified item in a quantity indicated by the understock condition are identified, and then, only one of the identified transporter clients is selected based upon a determined highest amount of identified excess capacity amongst the multiple ones of the transporter clients.

In yet another aspect of the embodiment, an indication of an understock condition of the specified item is received from multiple different clients, and only one of the clients with the understock condition is selected to receive the overstocked items according to a priority assigned to one of the clients with the understock condition. As an alternative, however, an indication of an understock condition of the specified item is received from multiple different clients, and only one of the clients with the understock condition is selected to receive the overstocked items according to a closest geographic proximity of the one of the clients with the understock condition to the client with the overstock condition.

In another embodiment of the invention, a stock management data processing system is configured for stock rebalancing. The system includes a host computing platform of one or more computers, each with memory and at least one processor. The host computing platform includes a first communicative coupling over computer communications network to different remote computing systems, a first subset of the different remote computing systems corresponding to individual inventory holding clients and providing stock level information for different items in inventory at different geographic locations and tracked by respective ones of the remote computing systems, and a second subset of the different remote computing systems each publishing transport capacity of corresponding transporter clients each able to transport items from one of the different geographic locations to another of the geographic locations.

The system further includes a stock rebalancer module. The module includes computer program instructions executing in the memory of the host computing platform. The instructions are enabled to register the inventory holding clients each as individual publishers of inventory level data, and further register the transporter clients each as individual publishers of transport capacity to the stock rebalancer, receive from one of the inventory holding clients, an indication of an overstock condition of a specified item and contemporaneously receive from another of the inventory holding clients, an indication of an understock condition of the specified item. The computer program instructions are further enabled to respond to the receipt of the indications of both the overstock and under stock conditions for the specified item by identifying one of the transporter clients indicating excess capacity sufficient to bear transport of the specified item in a quantity indicated by the understock condition, messaging the clients indicating the overstock, understock and excess capacity condition, and, directing the identified one of the transport clients to transport the specified item in the indicated quantity from the one of the inventory holding clients indicating the overstock condition to the one of the inventory holding clients indicating an understock condition.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for cooperative stock optimization for integrative supply chain management. In accordance with an embodiment of the invention, different understock and overstock conditions are sensed within a cooperative supply chain network in which different independent actors in the network, including inventory holding clients and transporters, share capacity and inventory information. In response to detecting an overstock condition in one of the inventory holding clients, other inventory holding clients having respective understock conditions are identified, and one of the respective inventory holding clients with an understock conditions is selected to receive the overstock. Then, one of the transporters is selected that has published sufficient capacity to transport the overstock items from the inventory holding client with the overstock condition to the inventory holding client with the understock condition. In this way, the balance of stock of the item can be optimally maintained within the supply chain.

Figure 1:
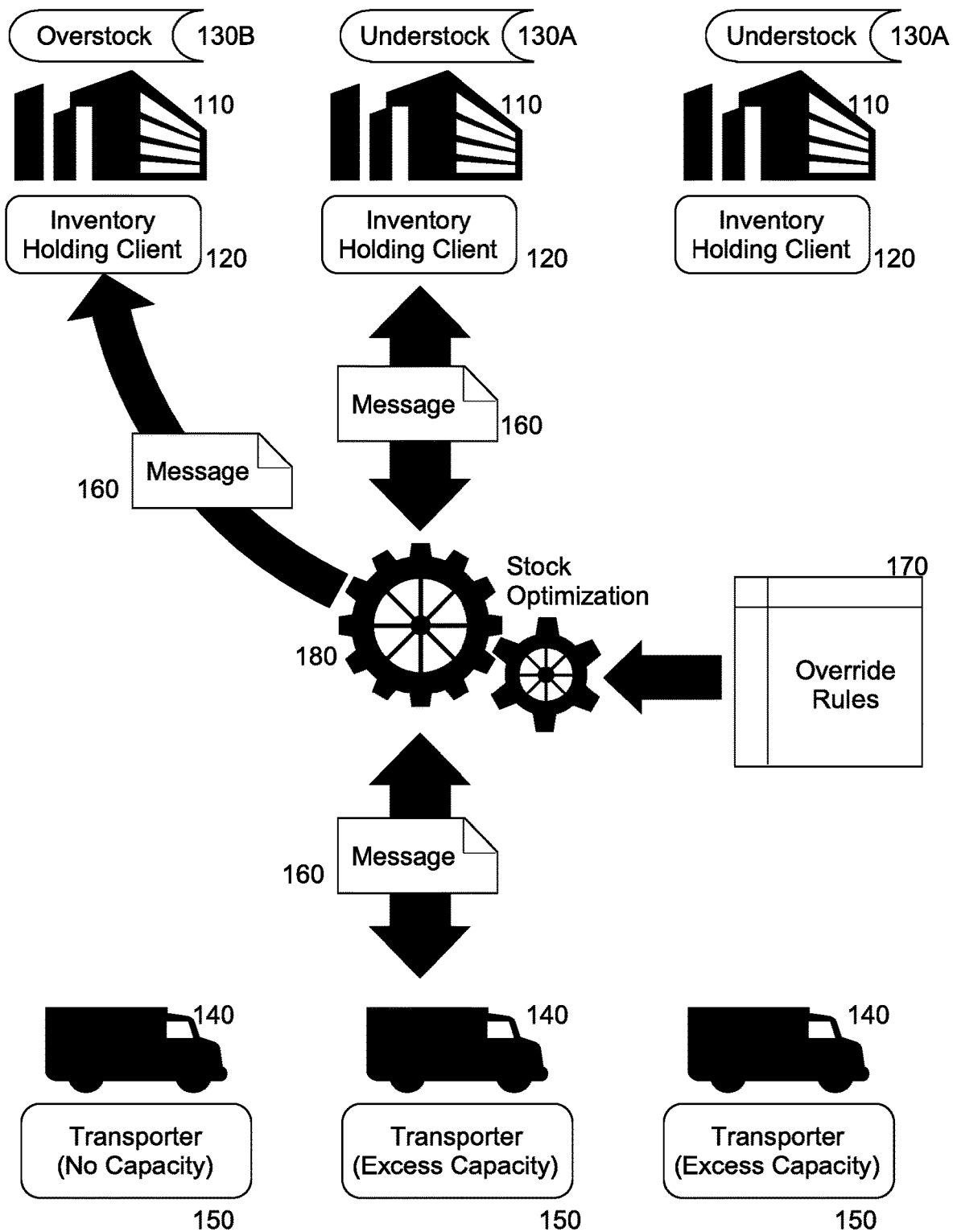
FIG. 1 is a pictorial illustration of a process for cooperative stock optimization for integrative supply chain management.

In further illustration, FIG. 1 pictorially shows a process for cooperative stock optimization for integrative supply chain management. As shown in FIG. 1, different inventory holding clients 120 for different inventory holding facilities 110 publish to stock optimization logic 180, different inventory stock conditions 130A, 130B for different items in inventor at the respective one of the inventory holding facilities 110. Those different inventory stock conditions 130A, 130B include both an understock condition 130A in which not enough of a particular item is present in inventory than required, and an overstock condition 130B in which more than enough of a particular item is present in inventory than required. In addition, different independent transporters 140 publish capacity information 150 to the stock optimization logic 180 in terms of an amount of volumetric space available to accommodate the transport of items within a geographically defined area.

The stock optimization logic 180 responds to the detection of an overstock condition 130B in one of the inventory holding clients 120 for a specified item by identifying one or more other inventory holding clients 120 publishing an understock condition 130A for the same specified item, and one or more transports 140 publishing sufficient excess capacity 150 to transport the specified item in the quantity indicated by the overstock condition 130B to one or more of the inventory holding clients 120 publishing the understock condition 130A. Stock optimization logic 180 then selects one of the inventory holding clients 120 publishing an understock condition 130A to receive the excess quantity of the specified item from the inventory holding client 120 publishing the overstock condition 130B.

In this regard, the stock optimization logic 180 may select the one of the inventory holding clients 120 publishing the understock condition 130A to receive the excess quantity of the specified item based upon a highest priority value assigned to the inventory holding clients 120 publishing the understock condition 130A. The priority value, for instance, may include a least recently selected one of the inventory holding clients 120, a least frequently selected one of the inventory holding clients 120, a highest deficiency in the specified item, or the lowest deficiency in the specified item so as to remove the understock condition 130A, or a geographically closest one of the inventory holding clients 120 to the one of the inventory holding clients 120 publishing the overstock condition 130B, to name only a few examples. As well, the stock optimization logic 180 may also refer to one or more override rules 170.

More particularly, the override rules 170 receive as input the identity of the specified item subject to the overstock condition 130B, the identity of the one of the inventory holding clients 120 publishing the overstock condition 130B and the understock conditions 130A, the identity of the transporters 140 publishing the excess capacity 150 and the cost of transportation by the transporters 140. To the extent that the override rules 170 do not permit the transport of the specified item from the inventory holding client 120 publishing the overstock condition 130B to the selected one of the inventory holding clients 120 publishing the understock condition 130A utilizing any of the prospective transporters 140 publishing the excess capacity 150, the specified item remains in inventory of the inventory holding client 120 publishing the overstock condition 130B. Otherwise, the stock optimization logic 180 transmits a message 160 directing the transfer of the excess quantity of the specified item to each of the inventory holding client 120 publishing the overstock condition 130B, the inventory holding client 120 publishing the understock condition 130A and selected to receive the excess quantity of the specified item, and the selected one of the transporters 140.

Figure 2:
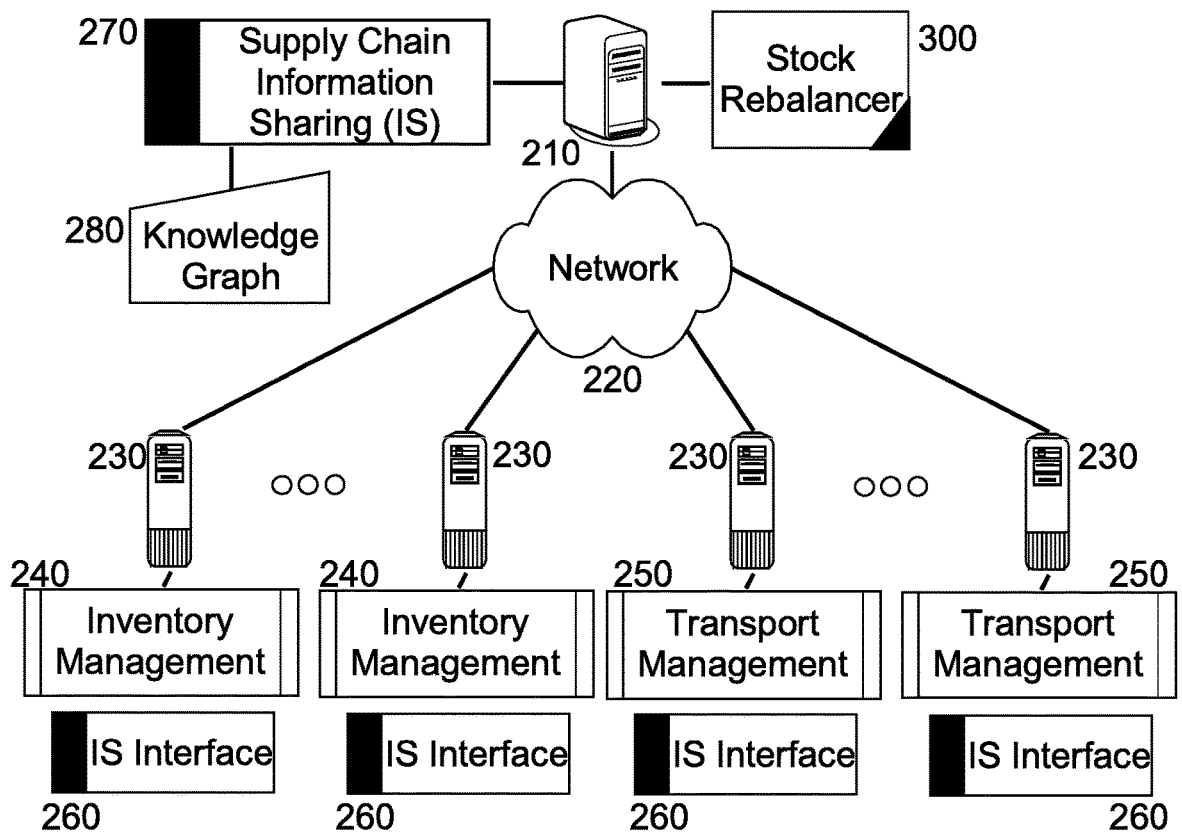
FIG. 2 is a schematic illustration of a data processing system configured for cooperative stock optimization for integrative supply chain management; and, FIG. 3 is a flow chart illustrating a process for cooperative stock optimization for integrative supply chain management.

The process described in connection with FIG. 1 may be implemented in a data processing system. In further illustration, FIG. 2 schematically shows a data processing system configured for cooperative stock optimization for integrative supply chain management. The system includes a host computing system 210 hosting execution of a supply chain information sharing application 270 operable to provide transparent and secure access to data in a knowledge graph 280 from over a computer communications network 220 from different actor information systems 240, 250 executing in respectively different servers 230 for correspondingly different actors in the supply chain through an information sharing interface 260 adapting the messages internal to the actor information systems 240, 250 to the knowledge graph 280 of the supply chain information sharing application 270.

Notably, the system yet further includes a stock rebalancer module 300. The stock rebalancer module 300 includes program code that when executing in the memory of the host computing system 210 is operable to detect an overstock condition of a specified product within the knowledge graph 280 as received from an inventory management system 240 corresponding to a particular inventory holding client. The program code also is enabled to detect an understock condition of the specified product within the knowledge graph 280 as received from an inventory management system 240 of a different inventory holding client. The program yet further is enabled to detect an excess capacity condition in the knowledge graph 280 as received from a transport management system 250 of a specific transporter. Consequently, the program code is enabled to message the inventory management systems 240 of each of the particular inventory holding client and the different inventory holding client, and the transportation management system 250 of the specific transporter, directing transfer of the excess quantity of the specified product from the particular inventory holding client to the different inventory holding client utilizing the excess capacity of the transporter.

Figure 3:
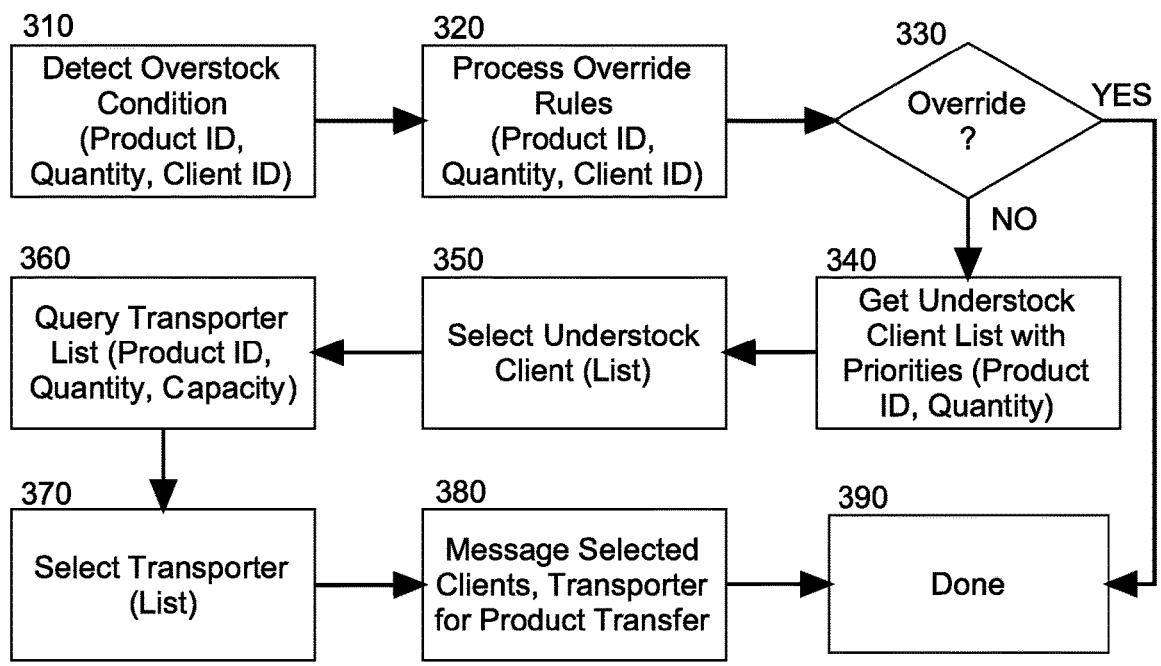

In yet further illustration of the operation of the stock rebalancer module 300, FIG. 3 is a flow chart illustrating a process for cooperative stock optimization for integrative supply chain management. Beginning in block 310, an overstock condition is detected in the knowledge graph in connection with a particular product identifier, in respect to a specific excess quantity and a specific inventory holding client. In block 320, override rules are processed to determine whether or not rebalancing is permitted in connection with the particular product identifier, the specific excess quantity and the specific inventory holding client. In decision block 330, if the override is not triggered, the process continues to block 340.

In block 340, a list of prospective inventory holding clients publishing an understock condition for the particular product identifier is retrieved from the knowledge graph and in block 350, one or more of the prospective inventory holding clients are selected to receive all or a portion of the excess quantity. Then, in block 360, a list of transporters having published excess capacity in the knowledge graph sufficient to accommodate the excess quantity are retrieved and each queried as to the ability to transfer the excess capacity from the inventory holding client publishing the overstock condition, to the selected one of the one or more inventory holding clients publishing the understock condition. In block 370, one of the transporters in the list is selected and in block 380, each of the selected transporter or transporters, the inventory holding client publishing the overstock condition, and the one or more inventory holding clients publishing the understock condition are messaged directing the transfer of the specified item from the inventory holding client publishing the overstock condition, to the selected one of the one or more inventory holding clients publishing the understock condition. Finally, the process ends in block 390

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A stock rebalancing method comprising
    executing a stock rebalancer in a host computing system and communicatively coupling the stock rebalancer to a supply chain information sharing system also executing in the host computing system, the supply chain information sharing system operable to provide transparent and secure access to data in a knowledge graph through an information sharing interface adapting messages to the knowledge graph, the knowledge graph organizing and integrating data according to an ontology and applying a reasoner to derive new knowledge;
    registering in the stock rebalancer separate inventory holding clients each as individual publishers of inventory level data to a stock rebalancer, and further registering separate transporter clients each as individual publishers of transport capacity to the stock rebalancer in terms of an amount of volumetric space available to accommodate transport of items within a geographically defined area;
    adapting messages received over a computer communications network from each of the inventory holding clients and the transporter clients to the knowledge graph through the information sharing interface of the supply chain information sharing system;
    receiving an indication from the knowledge graph in the stock rebalancer as placed therein from one of the inventory holding clients, an indication of an overstock condition of a specified item and contemporaneously receiving an indication from the knowledge graph in the stock rebalancer as placed therein from another of the inventory holding clients, an indication of an understock condition of the specified item; and,
    responsive to the receiving of the indications of both the overstock and under stock conditions for the specified item:
        identifying one of the transporter clients indicating excess capacity sufficient to bear transport of the specified item in a quantity indicated by the understock condition,
        messaging the one of the inventory holding clients, the another of the inventory holding clients and the one of the transporter clients indicating the overstock, the understock and the excess capacity condition,
        querying a table of override rules with an identity of the specified item, an identity of the one of the inventory holding clients publishing the overstock condition, an identity of the one of the inventory holding clients publishing the understock condition, an identity of the identified one of the transport clients and a cost of transportation by the identified one of the transport clients, and receiving in response an indication of whether or not the specified item is prohibited by an override rule referenced in the table to be transported from the one of the inventory holding clients publishing the overstock condition to the selected one of the one of the inventory holding clients indicating the understock condition, and,
        directing the identified one of the transport clients to transport the specified item in the indicated quantity from the one of the inventory holding clients indicating the overstock condition to the one of the inventory holding clients indicating the understock condition on condition that the override rules do not prohibit the specified item from being transported from the one of the inventory holding clients publishing the overstock condition to the selected one of the one of the inventory holding clients indicating the understock condition.

2. The method of claim 1, wherein multiple ones of the transporter clients indicating excess capacity sufficient to bear transport of the specified item in a quantity indicated by the understock condition are identified, and only one of the identified transporter clients selected based upon an assigned priority value.

3. The method of claim 1, wherein multiple ones of the transporter clients indicating excess capacity sufficient to bear transport of the specified item in a quantity indicated by the understock condition are identified, and only one of the identified transporter clients selected based upon a determined highest amount of identified excess capacity amongst the multiple ones of the transporter clients.

4. The method of claim 1, wherein an indication of an understock condition of the specified item is received from multiple different clients, and only one of the clients with the understock condition is selected to receive the overstocked items according to a priority assigned to one of the clients with the understock condition.

5. The method of claim 1, wherein an indication of an understock condition of the specified item is received from multiple different clients, and only one of the clients with the understock condition is selected to receive the overstocked items according to a closest geographic proximity of the one of the clients with the understock condition to the client with the overstock condition.

6. A stock management data processing system configured for stock rebalancing, the system comprising:
   a host computing platform of one or more computers, each with memory and at least one processor, the host computing platform comprising a supply chain information sharing application operable to provide transparent and secure access to data in a knowledge graph from over a computer communications network from different actor information systems executing in respectively different servers for correspondingly different actors in the supply chain through an information sharing interface adapting messages internal to the actor information systems to the knowledge graph of the supply chain information sharing application, the knowledge graph organizing and integrating data according to an ontology and applying a reasoner to derive new knowledge,
   the host computing platform further comprising a first communicative coupling over the computer communications network to different remote computing systems, a first subset of the different remote computing systems corresponding to individual inventory holding clients and providing stock level information in the knowledge graph for different items in inventory at different geographic locations and tracked by respective ones of the remote computing systems, a second subset of the different remote computing systems each publishing transport capacity in the knowledge graph of corresponding transporter clients each able to transport items from one of the different geographic locations to another of the geographic locations; and,
   a stock rebalancer module coupled to the knowledge graph and comprising computer program instructions executing in the memory of the host computing platform and enabled to register the inventory holding clients each as individual publishers of inventory level data to the knowledge graph, and further register the transporter clients each as individual publishers of transport capacity to the stock rebalancer in terms of an amount of volumetric space available to accommodate transport of items within a geographically defined area, receive from one of the inventory holding clients in the knowledge graph, an indication of an overstock condition of a specified item and contemporaneously receive from another of the inventory holding clients, an indication of an understock condition of the specified item, and respond to the receiving of the indications of both the overstock and under stock conditions for the specified item by:
   identifying one of the transporter clients indicating excess capacity sufficient to bear transport of the specified item in a quantity indicated by the understock condition,
   messaging the one of the inventory holding clients, the another of the inventory holding clients and the one of the transporter clients indicating the overstock, the understock and the excess capacity condition,
   querying a table of override rules with an identity of the specified item, an identity of the one of the inventory holding clients publishing the overstock condition, an identity of the one of the inventory holding clients publishing the understock condition, an identity of the identified one of the transport clients and a cost of transportation by the identified one of the transport clients, and receiving in response an indication of whether or not the specified item is prohibited by an override rule referenced in the table to be transported from the one of the inventory holding clients publishing the overstock condition to the selected one of the one of the inventory holding clients indicating the understock condition, and,
   directing the identified one of the transport clients to transport the specified item in the indicated quantity from the one of the inventory holding clients indicating the overstock condition to the one of the inventory holding clients indicating the understock condition on condition that the override rules do not prohibit the specified item from being transported from the one of the inventory holding clients publishing the overstock condition to the selected one of the one of the inventory holding clients indicating the understock condition.

7. The system of claim 6, wherein multiple ones of the transporter clients indicating excess capacity sufficient to bear transport of the specified item in a quantity indicated by the understock condition are identified, and only one of the identified transporter clients selected based upon an assigned priority value.

8. The system of claim 6, wherein multiple ones of the transporter clients indicating excess capacity sufficient to bear transport of the specified item in a quantity indicated by the understock condition are identified, and only one of the identified transporter clients selected based upon a determined highest amount of identified excess capacity amongst the multiple ones of the transporter clients.

9. The system of claim 6, wherein an indication of an understock condition of the specified item is received from multiple different clients, and only one of the clients with the understock condition is selected to receive the overstocked items according to a priority assigned to one of the clients with the understock condition.

10. The system of claim 6, wherein an indication of an understock condition of the specified item is received from multiple different clients, and only one of the clients with the understock condition is selected to receive the overstocked items according to a closest geographic proximity of the one of the clients with the understock condition to the client with the overstock condition.

11. A computer program product for stock rebalancing, the computer program product including a non-transitory computer readable storage medium having program instructions embodied therewith, the program instructions executable by a device to cause the device to perform a method including:

executing a stock rebalancer in a host computing system and communicatively coupling the stock rebalancer to a supply chain information sharing system also executing in the host computing system, the supply chain information sharing system operable to provide transparent and secure access to data in a knowledge graph through an information sharing interface adapting messages to the knowledge graph, the knowledge graph organizing and integrating data according to an ontology and applying a reasoner to derive new knowledge;

registering in the stock rebalancer separate inventory holding clients each as individual publishers of inventory level data to a stock rebalancer, and further registering separate transporter clients each as individual publishers of transport capacity to the stock rebalancer in terms of an amount of volumetric space available to accommodate transport of items within a geographically defined area;

adapting messages received over a computer communications network from each of the inventory holding clients and the transporter clients to the knowledge graph through the information sharing interface of the supply chain information sharing system;

receiving an indication from the knowledge graph in the stock rebalancer as placed therein from one of the inventory holding clients, an indication of an overstock condition of a specified item and contemporaneously receiving an indication from the knowledge graph in the stock rebalancer as placed therein from another of the inventory holding clients, an indication of an understock condition of the specified item; and, responsive to the receiving of the indications of both the overstock and under stock conditions for the specified item:

identifying one of the transporter clients indicating excess capacity sufficient to bear transport of the specified item in a quantity indicated by the understock condition, messaging the one of the inventory holding clients, the another of the inventory holding clients and the one of the transporter clients indicating the overstock, the understock and the excess capacity condition, querying a table of override rules with an identity of the specified item, an identity of the one of the inventory holding clients publishing the overstock condition, an identity of the one of the inventory holding clients publishing the understock condition, an identity of the identified one of the transport clients and a cost of transportation by the identified one of the transport clients, and receiving in response an indication of whether or not the specified item is prohibited by an override rule referenced in the table to be transported from the one of the inventory holding clients publishing the overstock condition to the selected one of the one of the inventory holding clients indicating the understock condition, and, directing the identified one of the transport clients to transport the specified item in the indicated quantity from the one of the inventory clients indicating the overstock condition to the one of the inventory holding clients indicating the understock condition on condition that the override rules do not prohibit the specified item from being transported from the one of the inventory holding clients publishing the overstock condition to the selected one of the one of the inventory holding clients indicating the understock condition.

12. The computer program product of claim 11, wherein multiple ones of the transporter clients indicating excess capacity sufficient to bear transport of the specified item in a quantity indicated by the understock condition are identified, and only one of the identified transporter clients selected based upon an assigned priority value.

13. The computer program product of claim 11, wherein multiple ones of the transporter clients indicating excess capacity sufficient to bear transport of the specified item in a quantity indicated by the understock condition are identified, and only one of the identified transporter clients selected based upon a determined highest amount of identified excess capacity amongst the multiple ones of the transporter clients.

14. The computer program product of claim 11, wherein an indication of an understock condition of the specified item is received from multiple different clients, and only one of the clients with the understock condition is selected to receive the overstocked items according to a priority assigned to one of the clients with the understock condition.

15. The computer program product of claim 11, wherein an indication of an understock condition of the specified item is received from multiple different clients, and only one of the clients with the understock condition is selected to receive the overstocked items according to a closest geographic proximity of the one of the clients with the understock condition to the client with the overstock condition.

\* \* \* \* \*